(12) United States Patent
Lahmann et al.

(10) Patent No.: US 8,768,572 B2
(45) Date of Patent: Jul. 1, 2014

(54) APPARATUS FOR DETECTING A ROLLOVER EVENT

(75) Inventors: Robert Lahmann, Stuttgart (DE); Michael Schmid, Kornwestheim (DE); Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 1896 days.

(21) Appl. No.: 10/523,299

(22) PCT Filed: Mar. 12, 2003

(86) PCT No.: PCT/DE03/00781
§ 371 (c)(1),
(2), (4) Date: Aug. 18, 2005

(87) PCT Pub. No.: WO2004/018262
PCT Pub. Date: Mar. 4, 2004

(65) Prior Publication Data
US 2006/0095182 A1 May 4, 2006

(30) Foreign Application Priority Data
Aug. 3, 2002 (DE) .................................. 102 35 567

(51) Int. Cl.
*B60R 22/10* (2006.01)
*E05F 15/00* (2006.01)
*G05D 1/00* (2006.01)

(52) U.S. Cl.
USPC ........................................................ 701/45

(58) Field of Classification Search
USPC ............ 701/45, 46; 180/268, 282; 280/728.1, 280/732, 735, 806; 200/61.53
See application file for complete search history.

(56) References Cited

U.S. PATENT DOCUMENTS

| | | | | |
|---|---|---|---|---|
| 4,767,588 A | * | 8/1988 | Ito | 701/41 |
| 4,809,183 A | * | 2/1989 | Eckert | 701/93 |
| 4,930,082 A | * | 5/1990 | Harara et al. | 701/38 |
| 4,998,593 A | * | 3/1991 | Karnopp et al. | 180/408 |
| 5,265,020 A | * | 11/1993 | Nakayama | 701/36 |
| 5,484,166 A | * | 1/1996 | Mazur et al. | 280/735 |
| 6,002,975 A | * | 12/1999 | Schiffmann et al. | 701/36 |
| 6,038,495 A | * | 3/2000 | Schiffmann | 701/1 |
| 6,050,360 A | * | 4/2000 | Pattok et al. | 180/446 |
| 6,086,168 A | * | 7/2000 | Rump | 303/191 |
| 6,104,284 A | * | 8/2000 | Otsuka | 340/440 |
| 6,141,604 A | * | 10/2000 | Mattes et al. | 701/1 |
| 6,167,335 A | * | 12/2000 | Ide et al. | 701/45 |
| 6,292,759 B1 | * | 9/2001 | Schiffmann | 702/151 |
| 6,529,810 B2 | * | 3/2003 | Foo et al. | 701/45 |
| 6,529,811 B2 | * | 3/2003 | Watson et al. | 701/45 |

(Continued)

FOREIGN PATENT DOCUMENTS

| | | |
|---|---|---|
| DE | 197 44 083 | 4/1999 |
| DE | 100 10 633 | 9/2001 |
| EP | 1 270 337 | 1/2003 |
| WO | 00 58133 | 10/2000 |

*Primary Examiner* — Bhavesh V Amin
(74) *Attorney, Agent, or Firm* — Kenyon & Kenyon LLP

(57) ABSTRACT

An apparatus for detecting a rollover event, which includes at least one acceleration sensor in the vertical direction of the vehicle and one acceleration sensor in the horizontal direction of the vehicle. A processor of the apparatus according to the invention will start a rollover algorithm in response to an inertial event, in order, as a function of the signal of the acceleration sensor in the vertical direction to detect the rollover event and as a function of it to trip restraint devices.

15 Claims, 2 Drawing Sheets

(56) References Cited

U.S. PATENT DOCUMENTS

| | | | |
|---|---|---|---|
| 6,560,519 B2* | 5/2003 | Williams et al. | 701/45 |
| 6,678,631 B2* | 1/2004 | Schiffmann | 702/151 |
| 6,701,276 B2* | 3/2004 | Kueblbeck et al. | 702/145 |
| 6,714,848 B2* | 3/2004 | Schubert et al. | 701/46 |
| 6,776,435 B2* | 8/2004 | Foo et al. | 280/735 |
| 6,810,313 B2* | 10/2004 | Cooper et al. | 701/45 |
| 6,834,218 B2* | 12/2004 | Meyers et al. | 701/1 |
| 6,978,200 B2* | 12/2005 | Ide et al. | 701/45 |
| 7,269,483 B2* | 9/2007 | Schubert et al. | 701/1 |
| 2002/0075142 A1* | 6/2002 | Foo et al. | 340/440 |
| 2002/0152012 A1* | 10/2002 | Watson et al. | 701/45 |
| 2002/0156561 A1* | 10/2002 | DeBoni | 701/48 |
| 2002/0198632 A1* | 12/2002 | Breed et al. | 701/1 |
| 2004/0002802 A1* | 1/2004 | Ide et al. | 701/45 |
| 2005/0060069 A1* | 3/2005 | Breed et al. | 701/29 |
| 2005/0134440 A1* | 6/2005 | Breed | 340/435 |
| 2005/0171672 A1* | 8/2005 | Wallner | 701/70 |
| 2006/0015237 A1* | 1/2006 | Kroeninger et al. | 701/70 |
| 2006/0100781 A1* | 5/2006 | Lin et al. | 701/216 |
| 2006/0184301 A1* | 8/2006 | Konno et al. | 701/45 |
| 2006/0232052 A1* | 10/2006 | Breed | 280/735 |
| 2006/0253239 A1* | 11/2006 | Williams | 701/45 |
| 2007/0005609 A1* | 1/2007 | Breed | 707/10 |
| 2007/0021915 A1* | 1/2007 | Breed et al. | 701/301 |
| 2007/0109111 A1* | 5/2007 | Breed et al. | 340/435 |
| 2008/0147280 A1* | 6/2008 | Breed | 701/46 |
| 2008/0275664 A1* | 11/2008 | Schmid et al. | 702/141 |
| 2009/0033540 A1* | 2/2009 | Breed et al. | 342/29 |

* cited by examiner

APPARATUS FOR DETECTING A ROLLOVER EVENT

FIELD OF THE INVENTION

The present invention is based on an apparatus for detecting a rollover event.

BACKGROUND INFORMATION

From German Published Patent Application No. 197 44 083, it is known for a rollover event to be detected and checked for plausibility using acceleration sensors in at least two directions in space and with at least one rotation rate sensor.

SUMMARY OF THE INVENTION

The apparatus according to the present invention for detecting a rollover event, has the advantage by comparison that especially rollovers about the transverse or Y axis of the vehicle are detectable without additional sensors. In particular, according to the present invention, it is unnecessary to measure the acceleration at several points in the vehicle and to derive the rotary motion of the vehicle from the comparison of the measurements. Instead, the fact is advantageously exploited that the ground acceleration, in a rollover about the Y axis, causes a change in the measured Z acceleration, that is, in the vertical direction of the vehicle, in the coordinate system installed in the vehicle. Such a measurement may be made at any arbitrary point in the vehicle, and accordingly with the sensor system in the central air bag control unit as well. This means that without additional expense for hardware, passenger protection in rollovers about the Y axis is optimized. Besides the primary use of the present invention in sensing Y-axis rollovers, however, it is also possible with the apparatus of the present invention to sense rollovers about the X axis, that is, the longitudinal direction of the vehicle.

All that is required is to transpose the X and Y axes in the sensing. Particularly in rollovers along the transverse axis of the vehicle, acceleration sensors in the X and Z directions are used for sensing the rollover, so that the appropriate restraint devices for protecting the vehicle passengers may then be activated.

It is especially advantageous that the inertial event with which the measurement or detection of the rollover event is initiated is the tripping of restraint devices. Alternatively, it is possible for a front tripping algorithm or side air bag algorithm at a defined point to send an appropriate signal to the rollover event detection algorithm. It is also possible for this signal to be dependent only on a measured acceleration signal in the longitudinal direction of the vehicle or the transverse direction of the vehicle, or on an integral of this measured acceleration. The inertial event is consequently the starting event for the method of the present invention.

Moreover, it is advantageous in that case that upon detection of the rollover event, subsequent characteristics in the vertical direction of the vehicle are evaluated in the acceleration. The acceleration must initially be negative in the inertial event; that is, it should point in the direction of the bottom of the vehicle. At the same time, the vertical acceleration of the vehicle must have a positive gradient, since then a slow change takes place from −1 g to 0 g during the rollover. Advantageously, accelerations in the transverse direction of the vehicle may be observed in addition, for instance in order to ascertain, by forming an integral of the acceleration in the Y direction, that no lateral motion is occurring. Such motion would be an indication of a rollover about the X axis. Alternatively or in addition, in the presence of a rotation rate sensor for rotation about the X axis, a rollover about the X axis may be excluded by the evaluation of the signal of that sensor. However, if the vehicle rolls over, then the suitably processed signal of the acceleration in the longitudinal direction of the vehicle, that is, the X direction, must have a low value of less than 1 g, with only a small proportion of high-frequency oscillation, and with a positive gradient, until the vehicle finally is vertical. From this it may be detected that the vehicle is no longer in an event involving spinning on the roadway.

It is furthermore advantageous that from the measured value for the Z acceleration in the system in the vehicle, the proportion of gravitational acceleration in the total acceleration in the Z direction is extracted by a suitable low-pass filter, so that the measured acceleration changes from −1 g (meaning that the vehicle is in the normal position; the gravitational acceleration points downward) through 0 g (meaning that the vehicle is vertical) to +1 g (meaning that the vehicle is resting on its roof). It must be assured here that offset correction of the Z acceleration signal during travel be effected slowly enough so as not to adulterate the measurement of the Y rollover. This offset correction may be switched off for specific situations. In addition, the X acceleration signal may be evaluated, whose course qualitatively is as follows:

If the inertial event is a crash at the front of the vehicle, the result is high-frequency oscillation, associated with a high value for the integral over the X acceleration, because of the severe braking of the vehicle. Next, the suitably processed X acceleration signal will attain the value of 1 g, meaning that the vehicle is now vertical, and then drops again to 0 g, with the vehicle resting on its roof.

Finally, if the inertial event is not followed by any rollover of the vehicle about the Y axis, it is also advantageous that in that case a time is defined up to which the Y rollover algorithm remains maximally activated. A preferred possible way of defining this time is via suitable detection of the intrinsic motion of the vehicle. If the vehicle is no longer in motion, then there is a wait for a predetermined length of time until a time that is predetermined is reached and tripping of the restraint devices for the Y rollover is no longer possible. A further possible way is to define this time as a predetermined time after the instant of the inertial event. This instant may also be defined on the basis of other aspects, such as the availability of the power supply for activating the passenger protection systems or for operating the required sensors. Still other events may also ensue that lead to tripping of the passenger protection systems provided for a Y rollover, in which case further sensing of the Y rollover is unnecessary.

DETAILED DESCRIPTION

Figure 1:
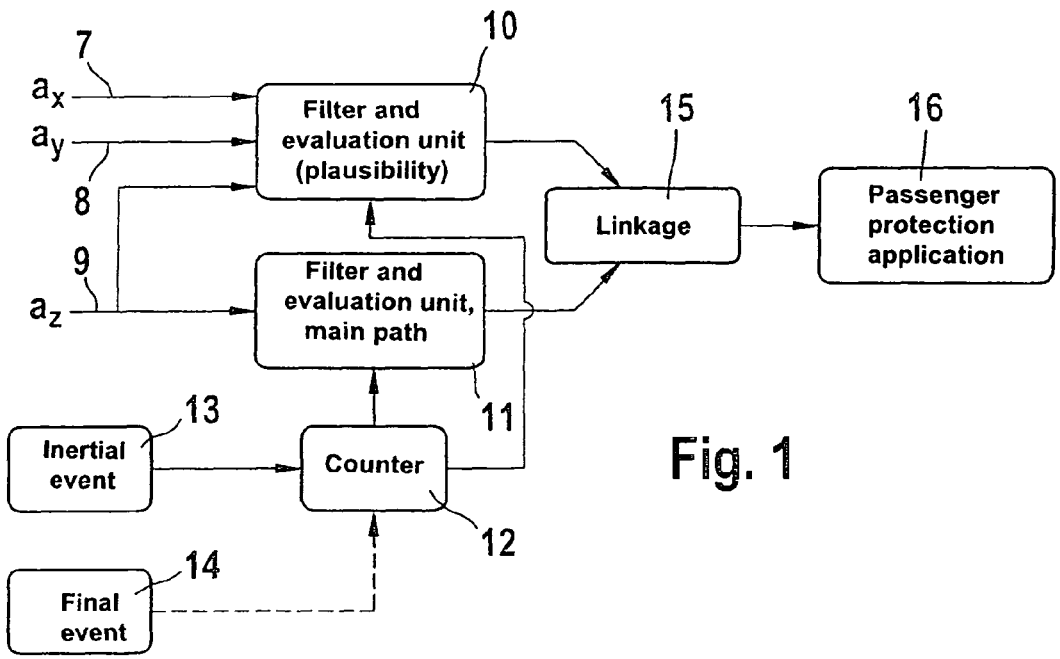
FIG. 1 shows a block circuit diagram of the apparatus of the invention.

Modern rollover sensing systems typically employ micromechanical rotation rate sensors, which also allow calculating the angle of rotation via a numerical integration. The combination of rotation rate and rotation angle information makes it possible to predict the rollover and thus to make a tripping decision that is sturdier and more flexible than tripping by way of a fixed angle threshold of an inclination sensor. Rollover sensing systems based on rotation rate sensors thus make it possible also to trip such irreversible restraint devices as belt tighteners and air bags, in addition to the original use of rollover sensing for tripping a rollbar in a convertible.

Nevertheless, inclination sensors have the advantage that they sense inclinations about both the X and the Y axis as well as any arbitrary combination of them, while rotation rate sensors have only one sensing direction. Theoretically, this disadvantage may easily be overcome by using two rotation rate sensors, one each for the X and Y axes. Statistically, however, the predominant number of all rollover events in the field involve rollovers about the X axis, that is, the longitudinal axis of the vehicle, so that for cost reasons only one rotation rate sensor is typically used. Accordingly, in present systems, sensing of rollovers about the Y axis is typically not done.

Modern systems for tripping restraint devices include not only rotation rate sensors but also a sensor system for measuring the X and Y acceleration for sensing head-on and side crashes. Moreover, in many cases, Y and Z sensors are used as a safety function, that is, as an independent plausibility checking path for making a tripping decision based on the rotation rate sensor in the event of rollover events.

According to the present invention, acceleration sensors in the X and Z direction are now employed in order to sense rollovers in the Y axis and thus to activate appropriate restraint devices to protect the vehicle passengers. In particular, the apparatus of the present invention thus makes it possible to sense Y rollovers without having to incorporate additional sensor systems in the vehicle. Such a measurement may be made at any arbitrary point in the vehicle, including using the sensor system in the central air bag control unit. This means that without additional expense for hardware, the passenger protection is optimized in the event of rollovers about the Y axis. With the apparatus of the present invention, however, it is also possible to sense rollovers about the X axis. For that purpose, the X and Y axes need merely be transposed in the present patent application.

A coordinate system installed in the vehicle in which the X axis points to the front, the Y axis points to the left, and the Z axis points upward is used below. If the vehicle is standing on flat ground, the gravitational acceleration points in the negative direction; that is, it has a value of −1 g.

First, the Y rollover algorithm is activated on the basis of an inertial event. As the inertial event, a signal is used that typically precedes a rollover about the Y axis. A vehicle that runs at high speed into a deep ditch, for instance, runs the risk of rolling over at its front end, that is, about the Y axis or transverse axis of the vehicle. In that case, a suitable inertial event would be tripping of the front air bags via the front algorithm, or a high value for the X acceleration, and/or its integral.

During the Y rollover, there is a comparatively slow change in the Z acceleration measured in the vehicle, because of the change in the coordinate system installed in the vehicle compared to the direction of action of the gravitational acceleration. If on the basis of the measured value of the Z acceleration in the system installed in the vehicle, the portion of gravitational acceleration is extracted from the total acceleration in the Z direction by a suitable low-pass filter, then what is expected is a change from −1 g through 0 g to 1 g. This means that initially the vehicle is in its normal position, then becomes vertical, and finally rests on its roof. It must be assured here that offset correction of the Z acceleration signal is either switched off for specific situations or proceeds slowly enough during travel that it does not adulterate the measurement during the Y rollover.

In addition, the X acceleration signal may be evaluated; its course qualitatively is as follows: If the inertial event is the collision at the front of the vehicle, the result is high-frequency oscillation, together with a high value for the integral over the X acceleration because of the severe braking of the vehicle. Next, the suitably processed acceleration signal will reach the value of 1 g. The vehicle is now vertical and then the value drops again to 0 g, meaning that the vehicle is now resting on its roof.

Figure 4:
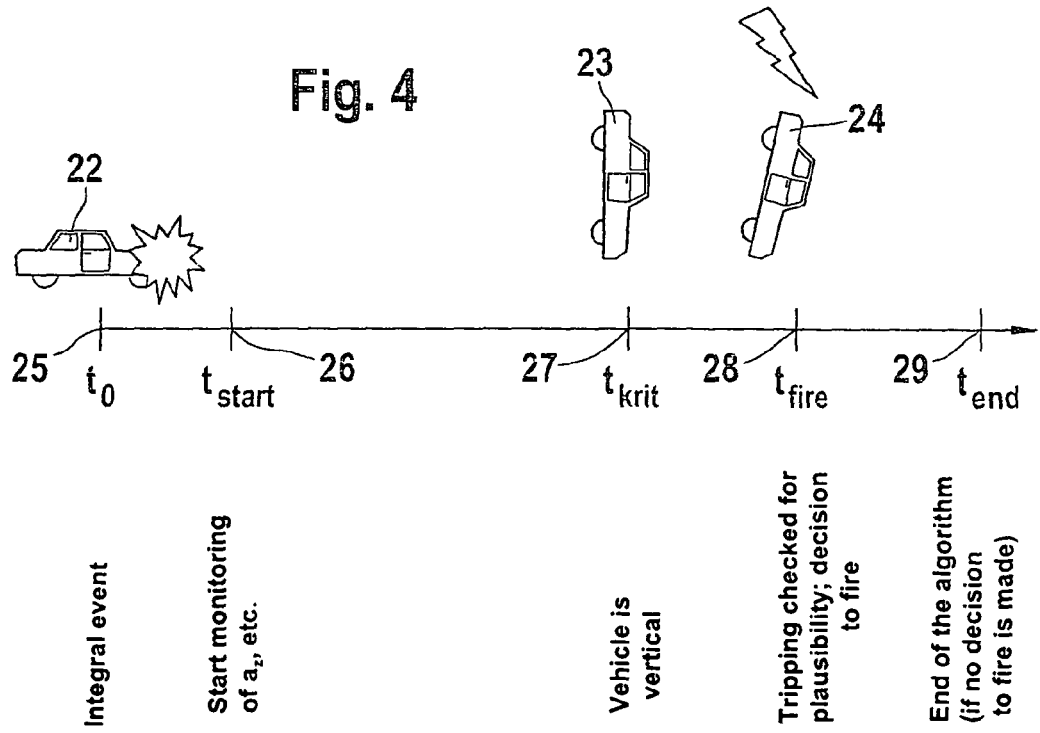
FIG. 4 shows a timeline of a vehicle rollover in the Y direction.

Thus initially an inertial event is detected that activates the Y rollover algorithm. Typically, this event may be a head-on collision, which is detected via the X acceleration sensor. The instant of the inertial event will hereinafter be defined as $t_0$, that is, the starting instant of the Y rollover algorithm. The timeline in the further course of the rollover algorithm is shown in FIG. 4. It is appropriate to reset the time $t_0$, here identified by reference numeral 25, the next time the X acceleration signal is sufficiently active. In this way, it is possible to cover instances in which a vehicle for instance initially has a head-on collision on the road and then skids off the road and finally Polls over in the roadside ditch. Then it is the second collision or impact that is decisive for initiating the Y rollover.

At a time $t_{start}$, marked in FIG. 4 by reference numeral 26, where $t_{start} \geq t_0$, the high-frequency oscillations caused by the inertial event in the X, Y and Z directions will have faded sharply enough. Depending on the vehicle, $t_{start}$ may also be equal to $t_0$. From time $t_{start}$ to time $t_{end}$, here identified by reference numeral 29, or in other words the end of the Y rollover algorithm, or $t_{fire}$, identified by reference numeral 28, which is the decision to fire in the algorithm, the suitably processed Z acceleration az will be monitored for certain characteristics. The following are possible examples of such characteristics:

At time $t_{start}$, the vertical acceleration az must be negative, and in addition, signal az, suitably processed, must have a positive gradient, that is, a slow change from −1 g to 0 g.

In addition, the suitably processed acceleration signals in the X and Y directions ax and ay may be monitored:

For example, by forming the integral of ay, monitoring may be done to find that the vehicle has no significant lateral motion, which would be an indication of a rollover about the Y axis. Alternatively, if a rotation rate sensor for rotation about the X axis is present, its signal may be evaluated, in order to distinguish a rollover about the X axis from a rollover about the Y axis.

If the vehicle rolls over, then the suitably processed signal ax must have a low value of less than 1 g, with only a slight portion of high-frequency oscillations and with a positive gradient, until the vehicle is vertical. From this it may be told that the vertical is no longer involved in a spinning event on the road. The time $t_{krit}$, marked in FIG. 4 by reference numeral 27, at which the vehicle is vertical is defined by the zero crossover of signal az. Tripping of suitable passenger protection systems takes place if the tripping is plausible by a time $t_{fire}$ 28, where $t_{krit} \leq t_{fire} \leq t_{end}$. The plausibility check is performed by monitoring signals ax, ay and az, specifically in a similar way to what is described above in general for monitoring in the period of time from $t_{start}$ to $t_{end}$. This involves for instance gradient monitoring of ax and/or az, or observing the acceleration values of ax, ay and az. For the case where the inertial event is not followed by a rollover of the vehicle about the Y axis, it is appropriate to define a time $t_{end}$ until which the Y rollover algorithm remains maximally activated. A preferred possible way of defining the time $t_{end}$ is suitable detection of the intrinsic motion of the vehicle. If the vehicle is no longer in motion, then a suitable length of time is waited out until the time $t_{end}$ is reached and thus tripping of the restraint devices for the Y rollover is no longer possible. A further possible way is to define $t_{end}$ as a predefined length of time after time $t_0$. The time $t_{end}$ may also be defined on the basis of other aspects, such as the availability of a power supply for activating the passenger protection systems or for operating the required sensors. Moreover, still other events may ensue that cause tripping of the passenger protection systems intended for a Y rollover, so that further sensing of the Y rollover is unnecessary.

FIG. 4 accordingly illustrates a Y rollover in its course over time. At time $t_0$, the vehicle in position 22 suffers a head-on collision. This is assessed as an inertial event. At time $t_{start}$ 26, monitoring of the acceleration in the Z direction and the other accelerations is then performed. At time $t_{krit}$ 27, the vehicle has reached the position 23; that is, it is standing vertically on its front end. At time 28, $t_{fire}$, the vehicle in position 24 now rolls over from its vertical position, and the restraint devices are tripped if plausibility exists. At time $t_{end}$ 29, the algorithm is ended, if by then no decision to trip or fire has been made.

Figure 3:
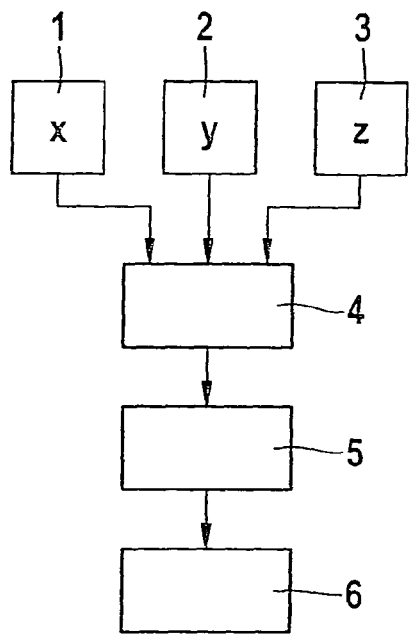
FIG. 3 shows a further block circuit diagram of the apparatus of the present invention.

The apparatus of the present invention is shown in the form of a block circuit diagram in FIG. 3. Acceleration sensors 1, 2 and 3, which pick up the acceleration in the X, Y and Z directions, are connected to a processor 4. Acceleration sensors 1, 2 and 3 are embodied here as digital sensors; that is, they already furnish a digital signal to processor 4 and thus they themselves already contain at least one analog/digital converter. More than these three sensors may also be used, or in other words a rotation rate sensor for rotation about the X axis may also be employed. For rollover sensing in the Y direction, it is necessary to use only the sensor in the Z direction, that is, sensor 3. To distinguish between rollovers in the X and Y directions, the sensor in the X direction, that is, sensor 1 or sensor 2 in the Y direction must additionally be used. Sensors 1 and 2 and other sensors that may also be present may moreover be used for checking the plausibility of the rollover sensing. Processor 4 carries out the above-described evaluation of the acceleration signals. In the process, however, the algorithm for the rollover event in the Y direction is not activated until an inertial event has been ascertained. As described above, a head-on collision that causes tripping of front air bags counts as an inertial event of this kind. This inertial event must be typical for an onset of a rollover event in the Y direction. To sense rollover events about the X axis, it is necessary to define suitable inertial events. In this case, a side crash, for instance, may be an inertial event. If processor 4 has detected a rollover event, then, when it makes a tripping decision, it will transmit a suitable signal to trigger-circuit control 5 at time $t_{fire}$, which then triggers restraint devices 6, such as air bags or belt tighteners or rollbars.

FIG. 1 shows the apparatus of the present invention and a method of the present invention in the form of a block circuit diagram. The accelerations in the X direction 7 and Y direction 8 as well as the Z direction 9 are fed into a filter and evaluation unit 10. Filter and evaluation unit 10 also performs the plausibility check. Filter and evaluation unit 11 represents the main path. Only the acceleration signal in the Z direction 9 is fed into it. An inertial event 13 starts a counter 12. This counter may be stopped by a final event 14. Counter 12 is connected to filter and evaluation unit 11 in the main path. If both filter and evaluation units 10 and 11 ascertain tripping of the restraint devices, or in other words if both form a tripping decision, then in linkage 15 this will lead to a signal that leads to tripping of a passenger protection application 16.

Accordingly, inertial event 13 starts counter 12 and with it the Y rollover algorithm. Measured accelerations 7, 8 and 9 are to filter and evaluation units 10 and 11 for the main path and the plausibility check. Counter 12 may affect filter and evaluation units 11 and 12 by defining times $t_{start}$ and $t_{end}$ as well as the period of time between $t_{krit}$ and $t_{fire}$. Optionally, the ending time of the algorithm $t_{end}$ may be determined by an external final event. The decision by filter and evaluation units 10 and 11 for the main path and the plausibility will be linked in a preferred application using a logical AND gate 15, and thus a tripping decision for passenger protection application 16 will be made.

Figure 2:
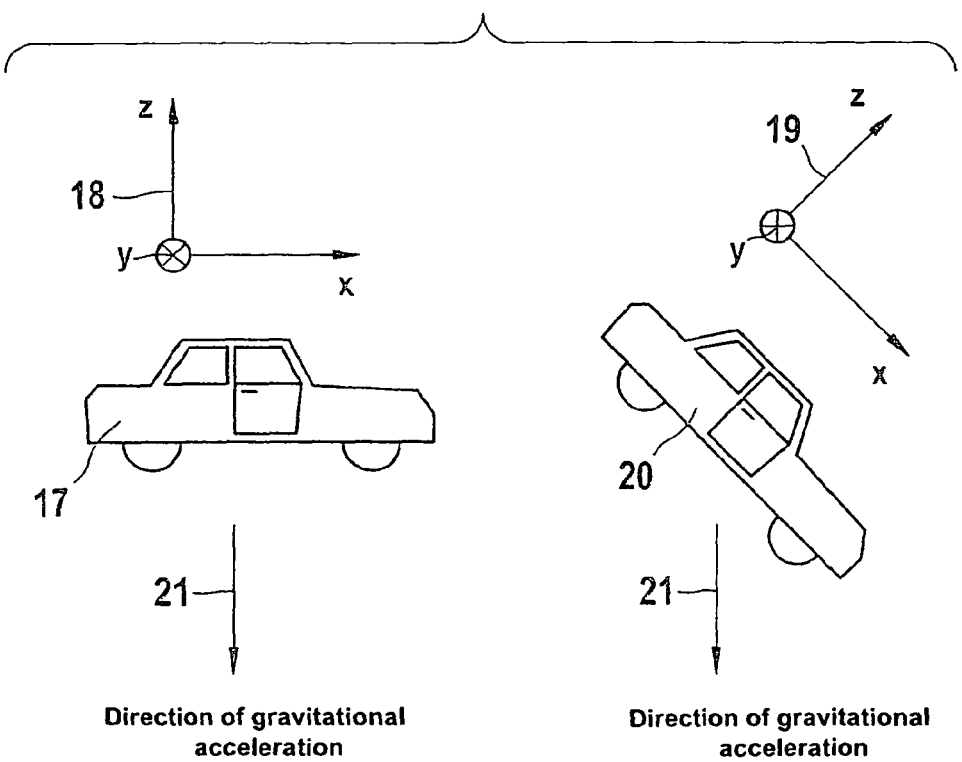
FIG. 2 shows a rollover event in the Y direction.

FIG. 2 again shows how coordinate system 18, which is installed in the vehicle, is located for a car 17 in a normal position. Here the gravitational acceleration is ascertained in the direction of bottom 21 of the vehicle. If the vehicle at position 20 then rolls over its Y axis, then coordinate system 18 rotates along with it. The direction of gravitational acceleration 21 is now different, relative to the vehicle.

As described above, by transposing the X and Y sensors and directions, it is also possible for rollovers about the X axis, which occur more often, to be detected by the apparatus of the present invention.

What is claimed is:

1. An apparatus for detecting a rollover event, comprising:
at least one first acceleration sensor in a vertical direction of a vehicle;
at least one second acceleration sensor in at least one horizontal direction of the vehicle; and
a processor for detecting an inertial event as a function of a first signal of the at least one second acceleration sensor, and after detection of the inertial event, evaluating a second signal from the at least one first acceleration sensor for detecting the rollover event, the processor triggering a restraint device as a function of the first signal and the second signal;
wherein the processor detects the inertial event in the form of the deployment of the restraint device in the event of one of (i) a head-on crash and (ii) a lateral crash or as a function of an acceleration signal in one of (i) a longitudinal direction of the vehicle and (ii) a transverse direction of the vehicle.

2. The apparatus as recited in claim 1, wherein the processor performs the evaluation by examining characteristics, in that the acceleration in the vertical direction of the vehicle in the inertial event is negative and the acceleration in the vertical direction has a positive gradient.

3. The apparatus as recited in claim 2, wherein the processor evaluates at least one of an acceleration in the transverse direction of the vehicle and a rotation rate about a vehicle longitudinal rate, in order to detect a lateral motion.

4. The apparatus as recited in claim 2, wherein the processor evaluates a vehicle acceleration in the longitudinal direction of the vehicle.

5. The apparatus as recited in claim 2, further comprising:
a low-pass filter for filtering an acceleration in the vertical direction of the vehicle, in order to extract a gravitational acceleration.

6. The apparatus as recited in claim 5, wherein the at least one first acceleration sensor includes an offset control so that a slow change takes place from −1 g to 0 g.

7. The apparatus as recited in claim 1, wherein in an absence of a detection of the rollover event, the processor is capable, after the first inertial event, of monitoring for a new inertial event.

8. The apparatus as recited in claim 1, further comprising:
at least one plausibility sensor.

9. The apparatus as recited in claim 1, further comprising:
a low-pass filter for filtering an acceleration in the vertical direction of the vehicle, in order to extract a gravitational acceleration;
wherein the processor performs the evaluation by examining characteristics, in that an acceleration in the vertical direction of the vehicle in the inertial event is negative and the acceleration in the vertical direction has a positive gradient.

10. The apparatus as recited in claim 9, wherein the processor evaluates at least one of an acceleration in the transverse direction of the vehicle and a rotation rate about a vehicle longitudinal rate, in order to detect a lateral motion.

11. The apparatus as recited in claim 9, wherein the processor evaluates a vehicle acceleration in the longitudinal direction of the vehicle, and wherein the at least one first acceleration sensor includes an offset control so that a slow change takes place from −1 g to 0 g.

12. The apparatus as recited in claim 9, wherein in an absence of a detection of the rollover event, the processor is capable, after the first inertial event, of monitoring for a new inertial event.

13. The apparatus as recited in claim 9, further comprising:
at least one plausibility sensor.

14. The apparatus as recited in claim 9, further comprising:
at least one plausibility sensor;
wherein the processor evaluates at least one of an acceleration in the transverse direction of the vehicle and a rotation rate about a vehicle longitudinal rate, in order to detect a lateral motion, and wherein in an absence of a detection of the rollover event, the processor, after the first inertial event, monitors a new inertial event.

15. The apparatus as recited in claim 9, further comprising:
at least one plausibility sensor;
wherein the processor evaluates a vehicle acceleration in the longitudinal direction of the vehicle, wherein the at least one first acceleration sensor includes an offset control so that a slow change takes place from −1 g to 0 g, and wherein in an absence of a detection of the rollover event, the processor, after the first inertial event, monitors a new inertial event.

\* \* \* \* \*